(12) United States Patent
Kitamoto

(10) Patent No.: US 11,368,082 B2
(45) Date of Patent: Jun. 21, 2022

(54) POWER CONVERSION DEVICE

(71) Applicant: HONDA MOTOR CO., LTD., Tokyo (JP)

(72) Inventor: Ryota Kitamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/107,979

(22) Filed: Dec. 1, 2020

(65) Prior Publication Data
US 2021/0194345 A1    Jun. 24, 2021

(30) Foreign Application Priority Data
Dec. 24, 2019    (JP) .............................. JP2019-233475

(51) Int. Cl.
*H02M 3/158*    (2006.01)
*H02M 1/088*    (2006.01)
(Continued)

(52) U.S. Cl.
CPC ......... *H02M 1/088* (2013.01); *H02M 3/1584* (2013.01); *H02M 7/539* (2013.01);
(Continued)

(58) Field of Classification Search
CPC . H02M 1/0067; H02M 3/1584; H02M 3/1586
(Continued)

(56) References Cited

U.S. PATENT DOCUMENTS 7,071,660 B2 * 7/2006 Xu .................. H02M 3/156
                                                   323/266
2009/0180305 A1 * 7/2009 Hashino ............ H01F 27/385
                                                   363/125
(Continued)

FOREIGN PATENT DOCUMENTS

JP        2007-116834        5/2007
JP        2012-157091        8/2012
(Continued)

OTHER PUBLICATIONS

Japanese Notice of Allowance for Japanese Patent Application No. 2019-233475 dated Sep. 14, 2021.

*Primary Examiner* — Gary A Nash
(74) *Attorney, Agent, or Firm* — Amin, Turocy & Watson, LLP

(57) ABSTRACT

A power conversion device includes a plurality of conversion units electrically connected in parallel to each other and configured to perform voltage conversion of electric power supplied from a power supply and a control device configured to set a conversion unit that will operate within the plurality of conversion units, wherein, after the number of conversion units that are operating within the plurality of conversion units is increased, the control device makes an electric current flowing through an operation start conversion unit which is a conversion unit that has started to operate from a non-operating state larger than an electric current flowing through an operation maintenance conversion unit which is a conversion unit that continues to operate before and after the number of operating conversion units is increased.

8 Claims, 9 Drawing Sheets

(51) Int. Cl.
*H02M 7/539* (2006.01)
*H02M 1/00* (2006.01)

(52) U.S. Cl.
CPC ........ *H02M 1/0003* (2021.05); *H02M 1/0067* (2021.05); *H02M 3/1586* (2021.05)

(58) Field of Classification Search
USPC ........................................ 323/271, 272, 284
See application file for complete search history.

(56) References Cited

U.S. PATENT DOCUMENTS

| | | | | |
|---|---|---|---|---|
| 2012/0224401 | A1* | 9/2012 | Phadke | H02M 3/1584 363/84 |
| 2012/0256571 | A1* | 10/2012 | Ang | H02M 3/1584 318/400.3 |
| 2013/0069610 | A1* | 3/2013 | Hashino | H02M 1/40 323/282 |
| 2017/0244338 | A1* | 8/2017 | Kitamoto | H02M 3/1584 |
| 2018/0097437 | A1* | 4/2018 | Komatsu | H02P 27/08 |
| 2018/0097454 | A1* | 4/2018 | Komatsu | H02M 7/49 |
| 2018/0115235 | A1* | 4/2018 | Ng | H02M 1/42 |
| 2018/0131184 | A1* | 5/2018 | Kitamoto | B60L 58/40 |
| 2018/0152108 | A1* | 5/2018 | Kim | H01F 27/24 |
| 2018/0301987 | A1* | 10/2018 | Abe | H02M 1/36 |

FOREIGN PATENT DOCUMENTS

| | | |
|---|---|---|
| JP | 2012-210013 | 10/2012 |
| JP | 2014-011904 | 1/2014 |
| JP | 2017-153240 | 8/2017 |
| JP | 2017-225227 | 12/2017 |
| JP | 2019-126184 | 7/2019 |
| JP | 2019-129606 | 8/2019 |

* cited by examiner

POWER CONVERSION DEVICE

CROSS-REFERENCE TO RELATED APPLICATION

Priority is claimed on Japanese Patent Application No. 2019-233475, filed Dec. 24, 2019, the content of which is incorporated herein by reference.

BACKGROUND OF THE INVENTION

Field of the Invention

The present invention relates to a power conversion device.

Description of Related Art

Conventionally, a power supply device including a conversion module having a plurality of conversion units configured to enable voltage conversion of electric power supplied by a power supply and electrically connected in parallel and a change unit configured to change the number of operations which is the number of conversion units for performing the voltage conversion is known (see, for example, Japanese Unexamined Patent Application, First Publication No. 2017-153240 (hereinafter referred to as Patent Document 1)).

SUMMARY OF THE INVENTION

In the power supply device described in Patent Document 1, a concept in which a temperature of a conversion unit that has started to operate from a non-operating state when the number of conversion units for performing voltage conversion is increased and a temperature of a conversion unit that continues to operate before and after the number of operating conversion units is increased are made uniform early is not adopted.

Thus, in the power supply device described in Patent Document 1, a temperature of the conversion unit that has started to operate from a non-operating state after the number of conversion units that are operating within a plurality of conversion units is increased and a temperature of the conversion unit that continues to operate before and after the number of operating conversion units is increased cannot be made uniform early.

In view of the above-described problems, an objective of an aspect according to the present invention is to provide a power conversion device capable of making a temperature of a conversion unit that has started to operate from a non-operating state after the number of conversion units that are operating within a plurality of conversion units is increased and a temperature of a conversion unit that continues to operate before and after the number of operating conversion units is increased uniform early.

To accomplish the associated objective by solving the above-described problems, the present invention adopts the following aspects.

(1) According to an aspect of the present invention, there is provided a power conversion device including: a plurality of conversion units electrically connected in parallel to each other and configured to perform voltage conversion of electric power supplied from a power supply; and a control device configured to set a conversion unit that will operate within the plurality of conversion units, wherein, after the number of conversion units that are operating within the plurality of conversion units is increased, the control device makes an electric current flowing through a conversion unit that has started to operate from a non-operating state larger than an electric current flowing through a conversion unit that continues to operate before and after the number of operating conversion units is increased.

(2) In the above-described aspect (1), the control device may make an electric current flowing through an operation start conversion unit which is the conversion unit that has started to operate from the non-operating state during a period in which the number of conversion units that are operating within the plurality of conversion units is increased larger than an electric current flowing through the operation start conversion unit after the period.

(3) In the above-described aspect (2), the control device may make the electric current flowing through the operation start conversion unit smaller than an electric current flowing through an operation maintenance conversion unit, which is a conversion unit that continues to operate before and after the number of operating conversion units is increased, from a starting time of the period to a predetermined time after the starting time, and the control device may make the electric current flowing through the operation start conversion unit larger than the electric current flowing through the operation maintenance conversion unit, from the predetermined time to an ending time of the period.

(4) In any one of the above-described aspects (1) to (3), the control device may make an electric current flowing through a conversion unit having a low temperature larger than an electric current flowing through a conversion unit having a high temperature when a difference in the plurality of conversion units is greater than or equal to a threshold value.

(5) In any one of the above-described aspects (1) to (4), the plurality of conversion units may include at least a first conversion unit and a second conversion unit serving as an operation maintenance conversion unit, which is a conversion unit that continues to operate before and after the number of operating conversion units is increased and a third conversion unit serving as an operation start conversion unit which is a conversion unit that has started to operate from the non-operating state, and, when there is a change from a second state in which the first conversion unit and the second conversion unit are operating and the third conversion unit is not operating to a third state in which the first conversion unit, the second conversion unit, and the third conversion unit are operating, the control device may make an electric current flowing through the third conversion unit larger than electric currents flowing through the first conversion unit and the second conversion unit.

(6) In the above-described aspect (5), when a temperature difference between the first conversion unit and the second conversion unit is less than a threshold value after switching from the second state to the third state, the control device may make the electric current flowing through the second conversion unit equal to the electric current flowing through the first conversion unit and make the electric current flowing through the third conversion unit larger than the electric current flowing through the first conversion unit.

(7) In the above-described aspect (6), when the temperature difference between the first conversion unit and the second conversion unit is greater than or equal to the threshold value after there is a change from a first state in which the first conversion unit is operating and the second conversion unit and the third conversion unit are not operating to the second state in which the first conversion unit and the second conversion unit are operating and the third conversion unit is not operating and subsequently switching from the second state to the third state in which the first conversion unit, the second conversion unit, and the third conversion unit are operating is performed, the control device may make the electric current flowing through the second conversion unit and the electric current flowing through the third conversion unit larger than the electric current flowing through the first conversion unit and may make an increase speed of the electric current flowing through the third conversion unit greater than an increase speed of the electric current flowing through the second conversion unit.

(8) In any one of the above-described aspects (1) to (4), the plurality of conversion units may include at least a first conversion unit, a second conversion unit, and a third conversion unit serving as an operation maintenance conversion unit, which is the conversion unit that continues to operate before and after the number of operating conversion units is increased, and a fourth conversion unit serving as an operation start conversion unit which is the conversion unit that has started to operate from the non-operating state, and, when there is a change from a third state in which the first conversion unit, the second conversion unit, and the third conversion unit are operating and the fourth conversion unit is not operating to a fourth state in which the first conversion unit, the second conversion unit, the third conversion unit, and the fourth conversion unit are operating, the control device may make an electric current flowing through the fourth conversion unit larger than electric currents flowing through the first conversion unit, the second conversion unit, and the third conversion unit.

In the above-described aspect (1), after the number of conversion units that are operating within the plurality of conversion units is increased, the control device makes an electric current flowing through a conversion unit (an operation start conversion unit) that has started to operate from a non-operating state larger than an electric current flowing through a conversion unit (an operation maintenance conversion unit) that continues to operate before and after the number of operating conversion units is increased.

Thus, in the above-described aspect (1), the temperature of the operation start conversion unit lower than the temperature of the operation maintenance conversion unit rapidly rises at a point in time before the number of operating conversion units is increased. As a result, after the number of conversion units that are operating within the plurality of conversion units is increased, the temperature of the operation start conversion unit and the temperature of the operation maintenance conversion unit can be made uniform early.

In the above-described aspects (2) and (3), an electric current flowing through an operation start conversion unit during a period in which the number of conversion units that are operating within the plurality of conversion units is increased is made larger than an electric current flowing through the operation start conversion unit after the period. That is, the electric current flowing through the operation start conversion unit may overshoot during the period. In detail, the electric current flowing through an operation maintenance conversion unit from a starting time of the period to a predetermined time after the starting time may be made smaller than the electric current flowing through the operation start conversion unit and the electric current flowing through the operation start conversion unit from the predetermined time to an ending time of the period may be made larger than the electric current flowing through the operation maintenance conversion unit.

In such a configuration, the temperature of the operation start conversion unit can be raised more quickly than when the electric current flowing through the operation start conversion unit does not overshoot. As a result, the temperature of the operation start conversion unit and the temperature of the operation maintenance conversion unit can be made uniform earlier than when the electric current flowing through the operation start conversion unit does not overshoot.

In the above-described aspect (4), an electric current flowing through a conversion unit having a low temperature may be made larger than an electric current flowing through a conversion unit having a high temperature when a temperature difference in the plurality of conversion units is greater than or equal to a threshold value.

In such a configuration, the temperature difference in the plurality of conversion units can be set to less than the threshold value early.

In the above-described aspect (5), when there is a change from a second state to a third state, an electric current flowing through the third conversion unit may be made larger than electric currents flowing through the first conversion unit and the second conversion unit.

In such a configuration, the temperatures of the first conversion unit and the second conversion unit and the temperature of the third conversion unit can be made uniform early after switching from the second state to the third state.

In the above-described aspects (6) and (7), when a temperature difference between the first conversion unit and the second conversion unit is less than a threshold value after switching from the second state to the third state, the electric current flowing through the second conversion unit may be made equal to the electric current flowing through the first conversion unit and the electric current flowing through the third conversion unit may be made larger than the electric current flowing through the first conversion unit. On the other hand, when a temperature difference between the first conversion unit and the second conversion unit is greater than or equal to the threshold value after switching from the second state to the third state, the electric current flowing through the second conversion unit and the electric current flowing through the third conversion unit may be made larger than the electric current flowing through the first conversion unit and an increase speed of the electric current flowing through the third conversion unit may be made greater than an increase speed of the electric current flowing through the second conversion unit.

In such a configuration, the temperature of the third conversion unit can be raised more quickly than when the increase speed of the electric current flowing through the third conversion unit is not greater than the increase speed of the electric current flowing through the second conversion unit.

In the above-described aspect (8), when there is a change from a third state in which the first conversion unit, the second conversion unit, and the third conversion unit are operating and the fourth conversion unit is not operating to a fourth state in which the first conversion unit, the second conversion unit, the third conversion unit, and the fourth conversion unit are operating, an electric current flowing through the fourth conversion unit may be made larger than electric currents flowing through the first conversion unit, the second conversion unit, and the third conversion unit.

In such a configuration, after switching from the third state to the fourth state, the temperatures of the first conversion unit, the second conversion unit, and the third conversion unit and the temperature of the fourth conversion unit can be made uniform early.

DETAILED DESCRIPTION OF THE INVENTION

Hereinafter, embodiments of a power conversion device of the present invention will be described with reference to the accompanying drawings.

First Embodiment

Figure 1:
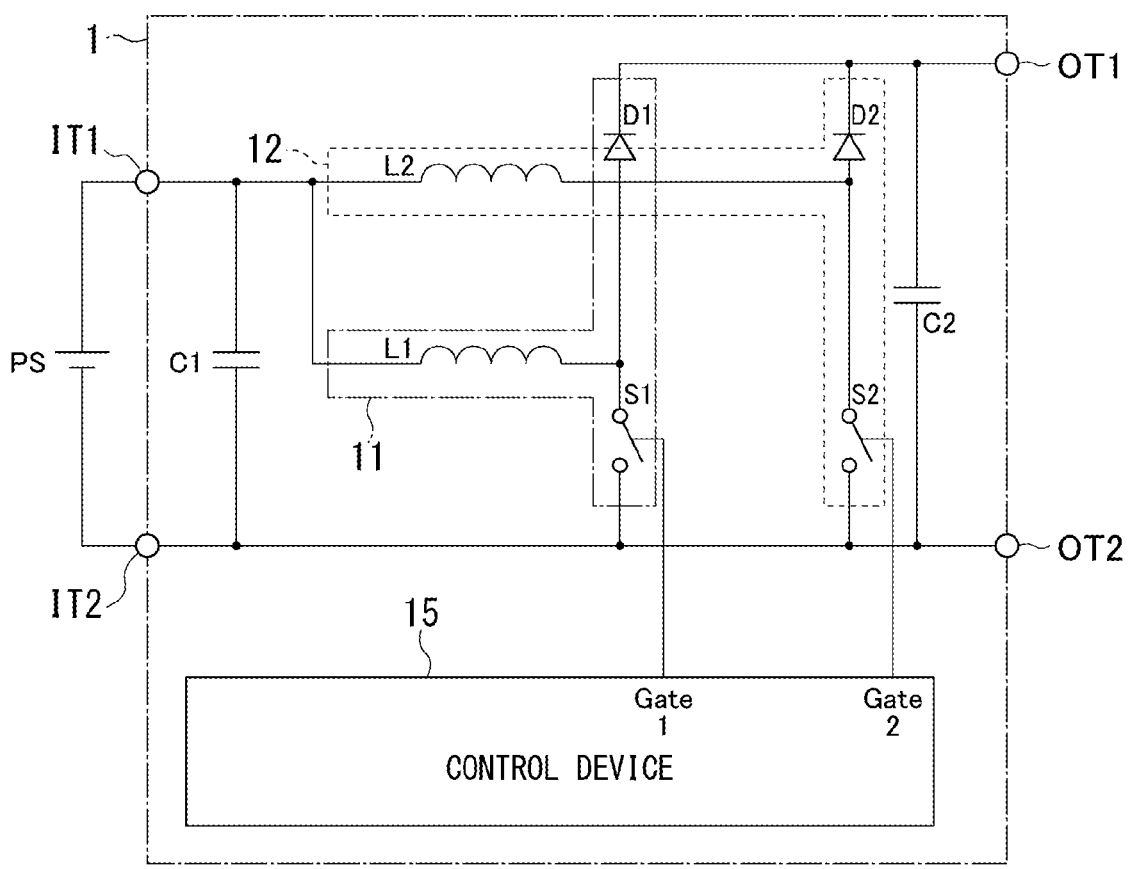
FIG. 1 is a diagram showing an example of a schematic configuration of a power conversion device of a first embodiment.

FIG. 1 is a diagram showing an example of a schematic configuration of a power conversion device 1 of the first embodiment.

In the example shown in FIG. 1, the power conversion device 1 performs voltage conversion of electric power supplied from a power supply PS. The power conversion device 1 includes conversion units 11 and 12, capacitors C1 and C2, and a control device 15.

The conversion units 11 and 12 perform voltage conversion of the electric power supplied from the power supply PS. The conversion unit 11 and the conversion unit 12 are electrically connected to each other in parallel. The conversion unit 11 includes a reactor L1, a diode D1, and a switch S1. The conversion unit 12 includes a reactor L2, a diode D2, and a switch S2.

The capacitor C1 restricts a change in a voltage input to the power conversion device 1. The capacitor C2 restricts a change in a voltage output from the power conversion device 1.

The control device 15 sets a conversion unit that operates within the conversion units 11 and 12. In detail, the control device 15 executes control of the switch S1 of the conversion unit 11 and control of the switch S2 of the conversion unit 12.

In the example shown in FIG. 1, a positive electrode of the power supply PS is connected to an input terminal IT1 of the power conversion device 1 and a negative electrode of the power supply PS is connected to an input terminal IT2 of the power conversion device 1.

The input terminal IT1 is connected to one end of the capacitor C1, one end of the reactor L1, and one end of the reactor L2.

The input terminal IT2 is connected to the other end of the capacitor C1, one end of the switch S1, one end of the switch S2, one end of the capacitor C2, and an output terminal OT2.

The other end of the reactor L1 is connected to the other end of the switch S1 and one end of the diode D1. The switch S1 is connected to the control device 15.

The other end of the reactor L2 is connected to the other end of the switch S2 and one end of the diode D2. The switch S2 is connected to the control device 15.

An output terminal OT1 is connected to the other end of the diode D1, the other end of the diode D2, and the other end of the capacitor C2.

Figure 2:
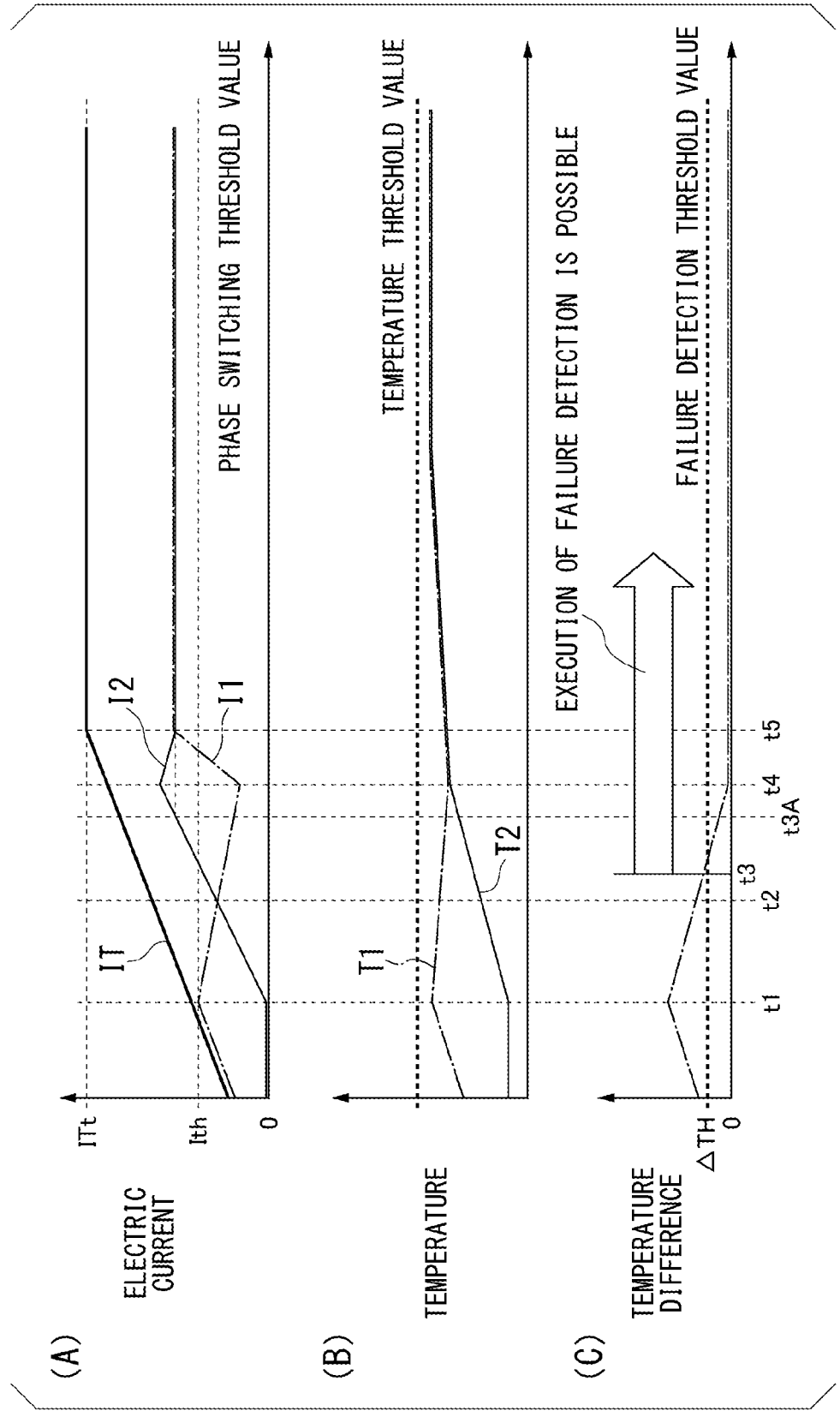
FIG. 2 is a diagram showing an electric current and the like flowing through a plurality of conversion units when the number of conversion units that are operating within a plurality of conversion units of the power conversion device of the first embodiment is increased.

FIG. 2 is a diagram showing electric currents I1 and I2 flowing through the conversion units 11 and 12 when the number of conversion units that are operating within the conversion units 11 and 12 of the power conversion device 1 of the first embodiment is increased. In detail, FIG. 2(A) shows electric currents I1 and I2 flowing through the conversion units 11 and 12 and the like when the number of conversion units that are operating within the conversion units 11 and 12 is increased, FIG. 2(B) shows temperatures T1 and T2 of the conversion units 11 and 12 when the number of conversion units that are operating within the conversion units 11 and 12 is increased, and FIG. 2(C) shows a temperature difference |T1−T2| between the conversion units 11 and 12 when the number of conversion units that are operating within the conversion units 11 and 12 is increased.

Figure 3:
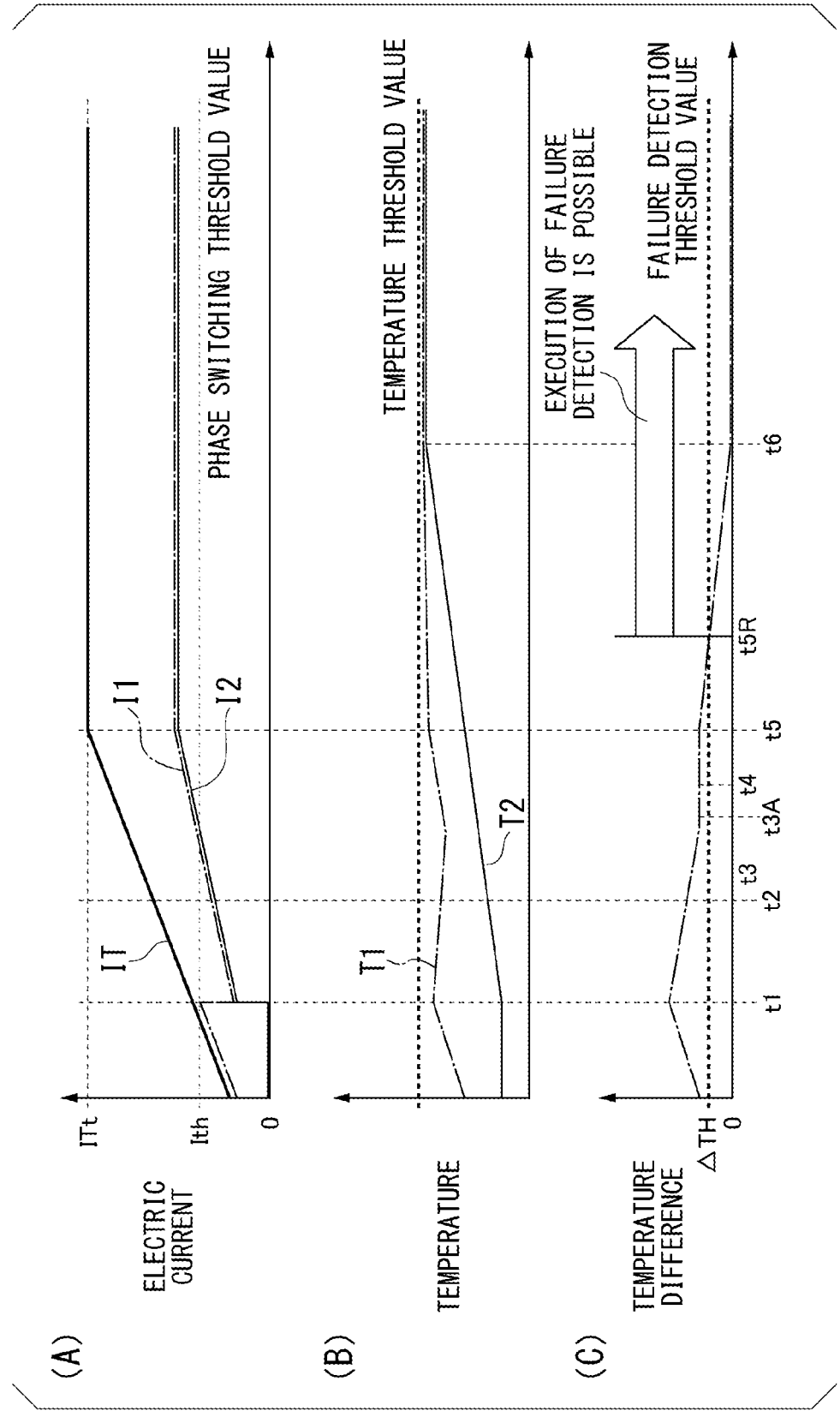
FIG. 3 is a diagram showing an electric current and the like flowing through a plurality of conversion units when the number of conversion units that are operating within a plurality of conversion units of a power conversion device of a comparative example configured as in the power conversion device of the first embodiment shown in FIG. 1 is increased.

FIG. 3 shows electric currents I1 and I2 flowing through the conversion units 11 and 12 and the like when the number of conversion units that are operating within the conversion units 11 and 12 of the power conversion device of a comparative example configured as in the power conversion device 1 of the first embodiment shown in FIG. 1 is increased. In detail, FIG. 3(A) shows the electric currents I1 and I2 flowing through the conversion units 11 and 12 and the like when the number of conversion units that are operating within the conversion units 11 and 12 is increased in the power conversion device of the comparative example, FIG. 3(B) shows temperatures T1 and T2 of the conversion units 11 and 12 when the number of conversion units that are operating within the conversion units 11 and 12 is increased in the power conversion device of the comparative example, and FIG. 3(C) shows a temperature difference |T1−T21| between the conversion units 11 and 12 when the number of conversion units that are operating within the conversion units 11 and 12 is increased in the power conversion device of the comparative example.

In the examples shown in FIGS. 2 and 3, because a total electric current IT flowing through the conversion units 11 and 12 is less than a phase switching threshold value Ith before time t1, only the conversion unit 11 is operating and the conversion unit 12 is not operating (the electric current I2 flowing through the conversion unit 12 is zero). That is, the number of conversion units that are operating within the conversion units 11 and 12 is "1."

Next, the total electric current IT flowing through the conversion units 11 and 12 reaches the phase switching threshold value Ith at time t1 and the number of conversion units that are operating within the conversion units 11 and 12 is increased from "1" to "2" during a period from time t1 to time t5.

In the example shown in FIG. 2 (the power conversion device 1 of the first embodiment), after time t1, the control device 15 executes control for making the temperature T2 of the conversion unit 12 that has started to operate from a non-operating state and the temperature T1 of the conversion unit 11 that continues to operate before and after the number of operating conversion units is increased uniform early.

Specifically, at times t1 to t4, the control device 15 causes the electric current I1 flowing through the conversion unit 11 to be decreased and causes the electric current I2 flowing through the conversion unit 12 to be increased so that the total electric current IT flowing through the conversion units 11 and 12 is increased. In detail, between time t1 and time t2, the electric current I1 flowing through the conversion unit 11 is larger than the electric current I2 flowing through the conversion unit 12. Next, between time t2 and time t4, the electric current I2 flowing through the conversion unit 12 is larger than the electric current I1 flowing through the conversion unit 11. As a result, at time t4, the temperature T1 of the conversion unit 11 and the temperature T2 of the conversion unit 12 become uniform.

In the example shown in FIG. 2, after time t5, the control device 15 controls the conversion units 11 and 12 so that the electric current I1 flowing through the conversion unit 11 becomes 50% of the total electric current IT flowing through the conversion units 11 and 12 and the electric current I2 flowing through the conversion unit 12 becomes 50% of the total electric current IT flowing through the conversion units 11 and 12.

Accordingly, between time t4 and time t5, the control device 15 executes control so that, at the time t5, the electric current I1 flowing through the conversion unit 11 becomes 50% of the total electric current IT flowing through the conversion units 11 and 12 and the electric current I2 flowing through the conversion unit 12 becomes 50% of the total electric current IT flowing through the conversion units 11 and 12. Specifically, between time t4 and time t5, the control device 15 causes the electric current I1 flowing through the conversion unit 11 to be increased and causes the electric current I2 flowing through the conversion unit 12 to be decreased. As a result, at time t5, the electric current I1 flowing through the conversion unit 11 becomes 50% of the total electric current IT flowing through the conversion units 11 and 12 and the electric current I2 flowing through the conversion unit 12 becomes 50% of the total electric current IT flowing through the conversion units 11 and 12.

That is, in the example shown in FIG. 2, after the number of conversion units that are operating within the conversion units 11 and 12 is increased (in detail, times t2 to t5), the control device 15 makes the electric current I2 flowing through the conversion unit 12 that has started to operate from the non-operating state larger than the electric current I1 flowing through the conversion unit 11 that continues to operate before and after the number of operating conversion units is increased.

Thus, in the example shown in FIG. 2, the temperature T2 of the conversion unit 12 that has started to operate from the non-operating state and the temperature T1 of the conversion unit 11 that continues to operate before and after the number of operating conversion units is increased can be made uniform earlier than in the example shown in FIG. 3.

In the example shown in FIG. 2, the control device 15 makes the electric current I2 flowing through the conversion unit 12 that has started to operate from the non-operating state during a period (in detail, times t3A to t5) in which the number of conversion units that are operating within the plurality of conversion units 11 and 12 is increased larger than the electric current I2 flowing through the conversion unit 12 after time t5. That is, the control device 15 causes the electric current I2 flowing through the conversion unit 12 to overshoot at times t3A to t5.

Thus, in the example shown in FIG. 2, the temperature T2 of the conversion unit 12 can be raised more quickly than when the electric current I2 flowing through the conversion unit 12 is not overshot. As a result, the temperature T1 of the conversion unit 11 and the temperature T2 of the conversion unit 12 can be made uniform earlier than when the electric current I2 flowing through the conversion unit 12 is not overshot.

In detail, in the example shown in FIG. 2, from starting time t1 to time t2 (at times t1 to t2) of a period (times t1 to t5) in which the number of conversion units that are operating within the conversion units 11 and 12 is increased from "1" to "2," the control device 15 makes the electric current I2 flowing through the conversion unit 12 smaller than the electric current I1 flowing through the conversion unit 11. Next, during a period (times t2 to t5) from time t2 to ending time t5 of the period (times t1 to t5), the control device 15 makes the electric current I2 flowing through the conversion unit 12 larger than the electric current I1 flowing through the conversion unit 11.

In the example shown in FIG. 2, the control device 15 makes the electric current I2 flowing through the conversion unit 12 having the low temperature T2 larger than the electric current I1 flowing through the conversion unit 11 having the high temperature T1 when the temperature difference |T1−T2| between the conversion units 11 and 12 is greater than or equal to the threshold value (substantially, at times t2 to t4 in a period (times t1 to t4) for which there is a temperature difference between the conversion unit 11 and the conversion unit 12 (|T1−T2|>0)).

Thus, in the example shown in FIG. 2, it is possible to make a state in which there is no temperature difference between the conversion unit 11 and the conversion unit 12 (T1−T2≈0) earlier than in the example shown in FIG. 3 (an example in which the electric current I2 flowing through the conversion unit 12 having a lower temperature than the conversion unit 11 is not made larger than the electric current I1 flowing through the conversion unit 11).

In the examples shown in FIGS. 1 and 2, each of the conversion unit 11 and the conversion unit 12 includes a temperature sensor (not shown). When the temperature difference |T1−T2| between the conversion unit 11 and the conversion unit 12 is greater than or equal to a failure detection threshold value ΔTH (see FIG. 2(C)) under an operation condition in which the temperature T1 of the conversion unit 11 and the temperature T2 of the conversion unit 12 should match, it is determined that at least one of the temperature sensor of the conversion unit 11 and the temperature sensor of the conversion unit 12 has failed (failure detection). In the example shown in FIG. 2, because the temperature difference |T1−T2| between the conversion unit 11 and the conversion unit 12 is less than or equal to a failure detection threshold value ΔTH after time t3, the above-mentioned failure detection can be performed after time t3.

In detail, in the example shown in FIG. 2, as described above, because the temperature T2 of the conversion unit 12 and the temperature T1 of the conversion unit 11 can be made uniform earlier than in the example shown in FIG. 3, failure detection can be performed earlier than in the example shown in FIG. 3 (an example in which failure detection can be performed after time t5R).

On the other hand, in the example shown in FIG. 3 (a power conversion device of the comparative example), control for making the electric current I1 flowing through the conversion unit 11 and the electric current I2 flowing through the conversion unit 12 uniform is executed after time t1.

That is, although the electric current I2 flowing through the conversion unit 12 is increased at times t1 to t5 in the example shown in FIG. 3, the increase speed of the electric current I2 flowing through the conversion unit 12 (a slope of the electric current I2 at times t1 to t5 in FIG. 3(A)) is less than the increase speed of the electric current I2 flowing through the conversion unit 12 in the example shown in FIG. 2 (a slope of the electric current I2 at times t1 to t4 in FIG. 2(A)).

Thus, in the example shown in FIG. 3, the temperature T2 of the conversion unit 12 rises slowly and a long time (times t1 to t6) is required until the temperature T1 of the conversion unit 11 and the temperature T2 of the conversion unit 12 become uniform.

In detail, in the example shown in FIG. 3, failure detection can be executed after time t5R when the temperature difference |T1−T2| between the conversion unit 11 and the conversion unit 12 is less than or equal to the failure detection threshold value ΔTH.

Figure 4:
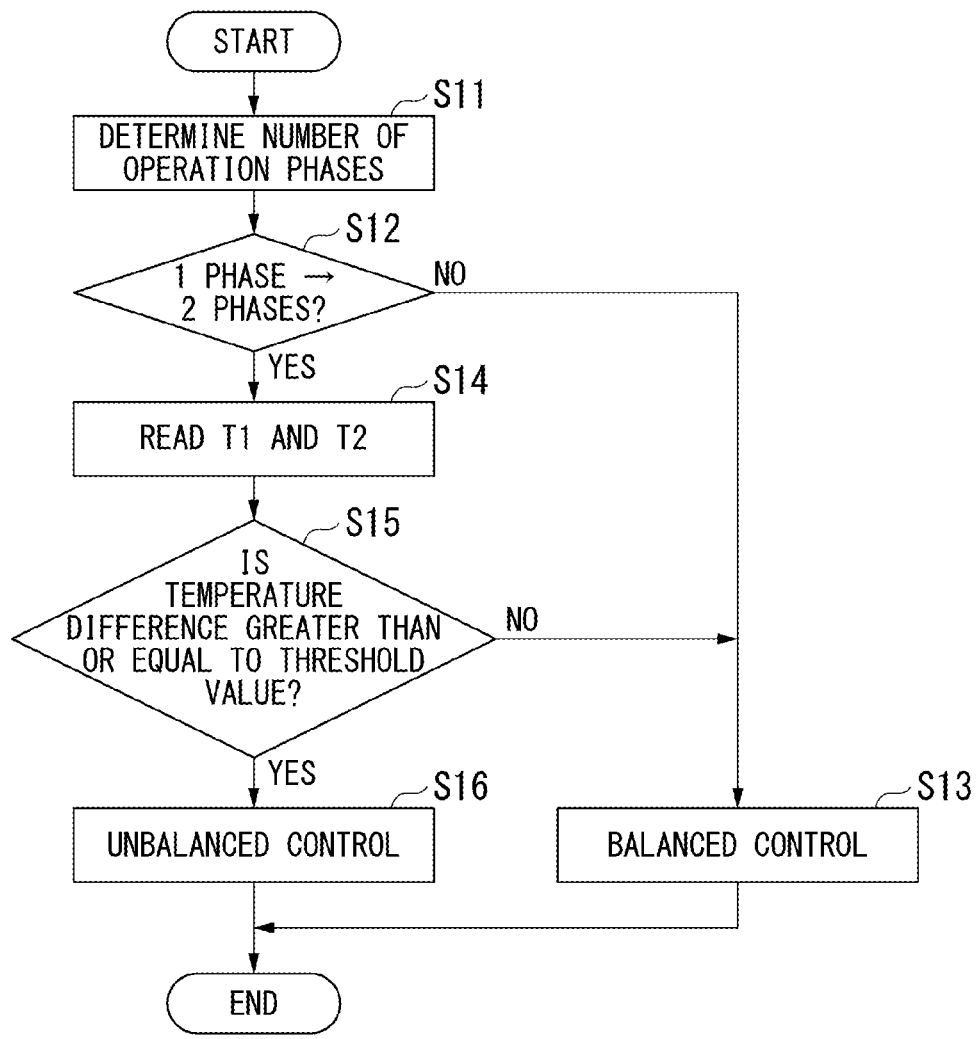
FIG. 4 is a flowchart for describing an example of a process executed in the power conversion device of the first embodiment.

FIG. 4 is a flowchart for describing an example of a process executed in the power conversion device 1 of the first embodiment.

In the example shown in FIG. 4, in step S11, the control device 15 executes a number-of-operation-phases determination (a determination of the number of conversion units that are operating within the conversion units 11 and 12).

In detail, in step S11, the control device 15 determines whether the total electric current IT flowing through the conversion units 11 and 12 is less than the phase switching threshold value Ith (see FIG. 2(A)) or is greater than or equal to the phase switching threshold value Ith or the like. When the total electric current IT flowing through the conversion units 11 and 12 is less than the phase switching threshold value Ith, the control device 15 determines that the number of operation phases is 1 (i.e., the number of conversion units that are operating within the conversion units 11 and 12 is "1"). When the total electric current IT flowing through the conversion units 11 and 12 is greater than or equal to the phase switching threshold value Ith, the control device 15 determines that the number of operation phases is 2 (i.e., the number of conversion units that are operating within the conversion units 11 and 12 is "2"). When there is a change from a state in which the total electric current IT flowing through the conversion units 11 and 12 is less than the phase switching threshold value Ith to a state in which the total electric current IT flowing through the conversion units 11 and 12 is greater than or equal to the phase switching threshold value Ith, the control device 15 determines that the number of operation phases is to be switched from 1 to 2 (i.e., the number of conversion units that are operating within the conversion units 11 and 12 is increased from "1" to "2").

Next, in step S12, the control device 15 determines whether or not the number of operation phases is to be switched from 1 to 2 (i.e., whether the number of conversion units that are operating within the conversion units 11 and 12 is to be increased from "1" to "2") on the basis of a determination result in step S11. When the number of operation phases is not to be switched from 1 to 2 (i.e., when the number of operating conversion units within the conversion units 11 and 12 is not to be increased from "1" to "2"), the process proceeds to step S13. On the other hand, when the number of operation phases is to be switched from 1 to 2 (i.e., when the number of operating conversion units within the conversion units 11 and 12 is to be increased from "1" to "2"), the process proceeds to step S14.

In step S13, the control device 15 executes balanced control.

In detail, when the total electric current IT flowing through the conversion units 11 and 12 is less than the phase switching threshold value Ith, the control device 15 makes the electric current I1 flowing through the conversion unit 11 equal to the total electric current IT flowing through the conversion units 11 and 12 and sets the electric current I2 flowing through the conversion unit 12 to zero.

When the total electric current IT flowing through the conversion units 11 and 12 is greater than or equal to the phase switching threshold value Ith, the control device 15 sets the electric current I1 flowing through the conversion unit 11 to 50% of the total electric current IT flowing through the conversion units 11 and 12 and sets the electric current I2 flowing through the conversion unit 12 to 50% of the total electric current IT flowing through the conversion units 11 and 12 (i.e., the electric current I1 flowing through the conversion unit 11 and the electric current I2 flowing through the conversion unit 12 are made uniform) or attempts to set the electric current I1 flowing through the conversion unit 11 to 50% of the total electric current IT flowing through the conversion units 11 and 12 and set the electric current I2 flowing through the conversion unit 12 to 50% of the total electric current IT flowing through the conversion units 11 and 12 (i.e., the electric current I1 flowing through the conversion unit 11 and the electric current I2 flowing through the conversion unit 12 are attempted to be made uniform) (see, for example, times t4 to t5 in FIG. 2(A)).

In step S14, the control device 15 reads the temperature T1 of the conversion unit 11 detected by the temperature sensor of the conversion unit 11 and reads the temperature T2 of the conversion unit 12 detected by the temperature sensor of the conversion unit 12.

Next, in step S15, the control device 15 determines whether or not the temperature difference |T1−T2| between the conversion units 11 and 12 is greater than or equal to the threshold value on the basis of the temperature T1 of the conversion unit 11 and the temperature T2 of the conversion unit 12 read in step S14. When the temperature difference |T1−T2| between the conversion units 11 and 12 is not greater than or equal to the threshold value (substantially, when there is no temperature difference between the conversion unit 11 and the conversion unit 12 (T1−T2≈0)), the process proceeds to step S13 and the control device 15 attempts to set the electric current I1 flowing through the conversion unit 11 to 50% of the total electric current IT flowing through the conversion units 11 and 12 and set the electric current I2 flowing through the conversion unit 12 to 50% of the total electric current IT flowing through the conversion units 11 and 12 (i.e., the electric current I1 flowing through the conversion unit 11 and the electric current I2 flowing through the conversion unit 12 are attempted to be made uniform) in step S13 (see, for example, times t4 to t5 in FIG. 2(A)). On the other hand, when the temperature difference |T1−T2| between the conversion units 11 and 12 is greater than or equal to the threshold value (substantially, there is a temperature difference between the conversion unit 11 and the conversion unit 12 (|T1−T2|>0)), the process proceeds to step S16.

In step S16, the control device 15 executes unbalanced control.

Figure 5:
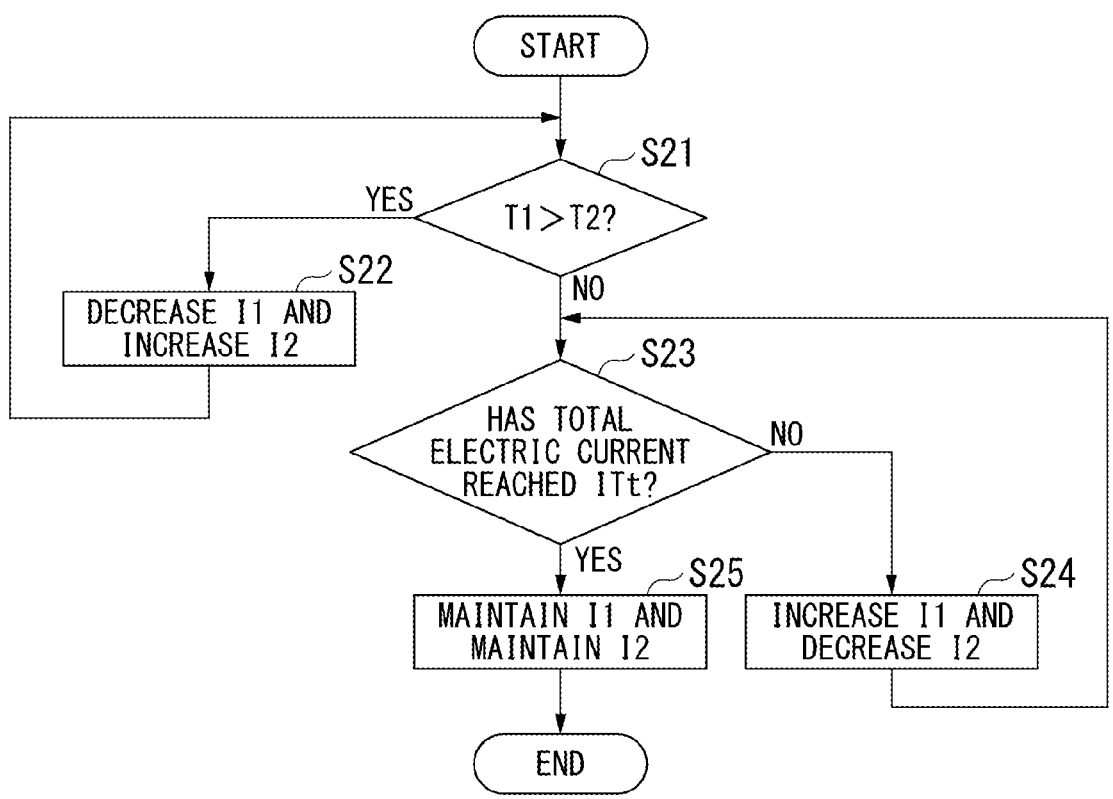
FIG. 5 is a flowchart for describing an example of unbalanced control and the like executed in step S16 of FIG. 4.

FIG. 5 is a flowchart for describing an example of unbalanced control and the like executed in step S16 of FIG. 4. A routine shown in FIG. 5 is started, for example, when step S16 of FIG. 4 is executed.

In the example shown in FIG. 5, in step S21, the control device 15 determines whether or not the temperature T1 of the conversion unit 11 is higher than the temperature T2 of the conversion unit 12 on the basis of the temperature T1 of the conversion unit 11 and the temperature T2 of the conversion unit 12 read in step S14 of FIG. 4. When the temperature T1 of the conversion unit 11 is higher than the temperature T2 of the conversion unit 12, the process proceeds to step S22. On the other hand, when the temperature T1 of the conversion unit 11 is not higher than the temperature T2 of the conversion unit 12 (in detail, when the temperature T1 of the conversion unit 11 is equal to the temperature T2 of the conversion unit 12), the process proceeds to step S23.

In step S22, the control device 15 causes the electric current I1 flowing through the conversion unit 11 to be decreased and causes the electric current I2 flowing through the conversion unit 12 to be increased so that the total electric current IT flowing through the conversion units 11 and 12 is increased (for example, see times t1 to t4 in FIG. 2(A)). Next, the process returns to step S21.

In step S23, the control device 15 determines whether or not the total electric current IT flowing through the conversion units 11 and 12 has reached a target total electric current value ITt (see FIG. 2(A)). When the total electric current IT flowing through the conversion units 11 and 12 has not reached the target total electric current value ITt, the process proceeds to step S24. On the other hand, when the total electric current IT flowing through the conversion units 11 and 12 has reached the target total electric current value ITt, the process proceeds to step S25.

In step S24, the control device 15 causes the electric current I1 flowing through the conversion unit 11 to be increased and causes the electric current I2 flowing through the conversion unit 12 to be decreased so that the total electric current IT flowing through the conversion units 11 and 12 is increased (for example, see times t4 to t5 in FIG. 2(A)). Next, the process returns to step S23.

In step S25, the control device 15 maintains the electric current I1 flowing through the conversion unit 11 and maintains the electric current I2 flowing through the conversion unit 12 so that the total electric current IT flowing through the conversion units 11 and 12 matches the target total electric current value ITt (see, for example, the time after time t5 in FIG. 2(A)).

In the example shown in FIG. 2, before time t1, in step S11 of FIG. 4, the control device 15 determines that the number of operation phases is 1 (i.e., the number of conversion units that are operating within the conversion units 11 and 12 is "1"). In step S12 of FIG. 4, the control device 15 determines that the number of operation phases is not to be switched from 1 to 2 (i.e., the number of conversion units that are operating within the conversion units 11 and 12 is not to be increased from "1" to "2"). In step S13 of FIG. 4, the control device 15 executes balanced control (in detail, the electric current I1 flowing through the conversion unit 11 is made equal to the total electric current IT flowing through the conversion units 11 and 12 and the electric current I2 flowing through the conversion unit 12 is set to zero).

In the example shown in FIG. 2, at times t1 to t5, the control device 15 determines that the number of operation phases is to be switched from 1 to 2 (i.e., the number of conversion units that are operating within the conversion units 11 and 12 is to be increased from "1" to "2") in steps S11 and S12 of FIG. 4 and the control device 15 reads the temperature T1 of the conversion unit 11 and the temperature T2 of the conversion unit 12 in step S14 of FIG. 4.

In the example shown in FIG. 2, at times t1 to t4, the control device 15 determines that the temperature difference |T1−T2| between the conversion units 11 and 12 is greater than or equal to the threshold value (substantially, there is a temperature difference between the conversion unit 11 and the conversion unit 12 (↑T1−T2|>0)) in step S15 of FIG. 4, the control device 15 determines that the temperature T1 of the conversion unit 11 is higher than the temperature T2 of the conversion unit 12 in step S21 of FIG. 5, and the control device 15 causes the electric current I1 flowing through the conversion unit 11 to be decreased and causes the electric current I2 flowing through the conversion unit 12 to be increased so that the total electric current IT flowing through the conversion units 11 and 12 is increased in step S22 of FIG. 5.

In the example shown in FIG. 2, at times t4 to t5, the control device 15 determines that the temperature difference |T1−T2| between the conversion units 11 and 12 is not greater than or equal to the threshold value (i.e., there is no temperature difference between the conversion unit 11 and the conversion unit 12 (T1−T2≈0)) in step S15 of FIG. 4 and the control device 15 attempts to set the electric current I1 flowing through the conversion unit 11 to 50% of the total electric current IT flowing through the conversion units 11 and 12 and set the electric current I2 flowing through the conversion unit 12 to 50% of the total electric current IT flowing through the conversion units 11 and 12 (i.e., the electric current I1 flowing through the conversion unit 11 and the electric current I2 flowing through the conversion unit 12 are attempted to be made uniform) in step S13 of FIG. 4. In detail, the control device 15 causes the electric current I1 flowing through the conversion unit 11 to be increased and causes the electric current I2 flowing through the conversion unit 12 to be decreased so that the total electric current IT flowing through the conversion units 11 and 12 is increased and the electric current I1 flowing through the conversion unit 11 and the electric current I2 flowing through the conversion unit 12 are made uniform.

In the example shown in FIG. 2, after the time t5, in step S11 of FIG. 4, the control device 15 determines that the number of operation phases is 2 (i.e., the number of conversion units that are operating within the conversion units 11 and 12 is "2"). The control device 15 determines that the number of operation phases is not to be switched from 1 to 2 (i.e., the number of conversion units that are operating within the conversion units 11 and 12 is not to be increased from "1" to "2") in step S12 of FIG. 4 and the control device 15 executes balanced control in step S13 of FIG. 4. In detail, in step S13 of FIG. 4, the control device 15 sets the electric current I1 flowing through the conversion unit 11 to 50% of the total electric current IT flowing through the conversion units 11 and 12 and set the electric current I2 flowing through the conversion unit 12 to 50% of the total electric current IT flowing through the conversion units 11 and 12 (i.e., the electric current I1 flowing through the conversion unit 11 and the electric current I2 flowing through the conversion unit 12 are made uniform).

In the power conversion device (i.e., a general power conversion device) of the comparative example as shown in FIG. 3, the number of conversion units (the number of operation phases) that operate within the plurality of conversion units 11 and 12 is determined in accordance with the total electric current flowing through the power conversion device. When a plurality of conversion units 11 and 12 operate (i.e., when the number of operation phases is 2), the electric current I1 flowing through the conversion unit 11 and the electric current I2 flowing through the conversion unit 12 are made uniform (see time after time t1 in FIG. 3(A)).

In detail, in the power conversion device of the comparative example as shown in FIG. 3, during a period (times t1 to t5) in which the number of conversion units that are operating within the conversion units 11 and 12 is increased from "1" to "2", the electric current I1 flowing through the conversion unit 11 and the electric current I2 flowing through the conversion unit 12 are also made uniform.

Thus, in the power conversion device of the comparative example as shown in FIG. 3, a long time (times t1 to t6) is required until the temperature T1 of the conversion unit 11 and the temperature T2 of the conversion unit 12 become uniform. Along with this, a long time (times t1 to t5R) is required until the failure detection can be performed.

On the other hand, in the example shown in FIG. 2 (the power conversion device 1 of the first embodiment), a period (times t1 to t5) in which the number of conversion units that are operating within the conversion units 11 and 12 is increased from "1" to "2" includes a period (times t2 to t5) in which the electric current I2 flowing through the conversion unit 12 that has started to operate from a non-operating state becomes greater than the electric current I1 flowing through the conversion unit 11 that continues to operate before and after the number of operating conversion units is increased.

Specifically, in the example shown in FIG. 2, unbalanced control for causing the electric current I1 flowing through the conversion unit 11 to be different from the electric current I2 flowing through the conversion unit 12 is executed at times t1 to t4 when the temperature difference |T1−T2| between the conversion units 11 and 12 is greater than or equal to the threshold value (i.e., times t1 to t4 when there is a temperature difference between the conversion unit 11 and the conversion unit 12). In detail, at times t1 to t4, the control device 15 causes the electric current I2 flowing through the low-temperature conversion unit 12 to be increased and causes the electric current I1 flowing through the high-temperature conversion unit 11 to be decreased.

Thus, in the example shown in FIG. 2, the temperature T2 of the conversion unit 12 and the temperature T1 of the conversion unit 11 can be made uniform earlier than in the example shown in FIG. 3.

Second Embodiment

Hereinafter, a second embodiment of a power conversion device of the present invention will be described.

A power conversion device 1 of the second embodiment is configured as in the power conversion device 1 of the first embodiment described above, except for points to be described below. Accordingly, according to the power conversion device 1 of the second embodiment, advantageous effects similar to those of the power conversion device 1 of the first embodiment described above can be obtained, except for the points to be described below.

Figure 6:
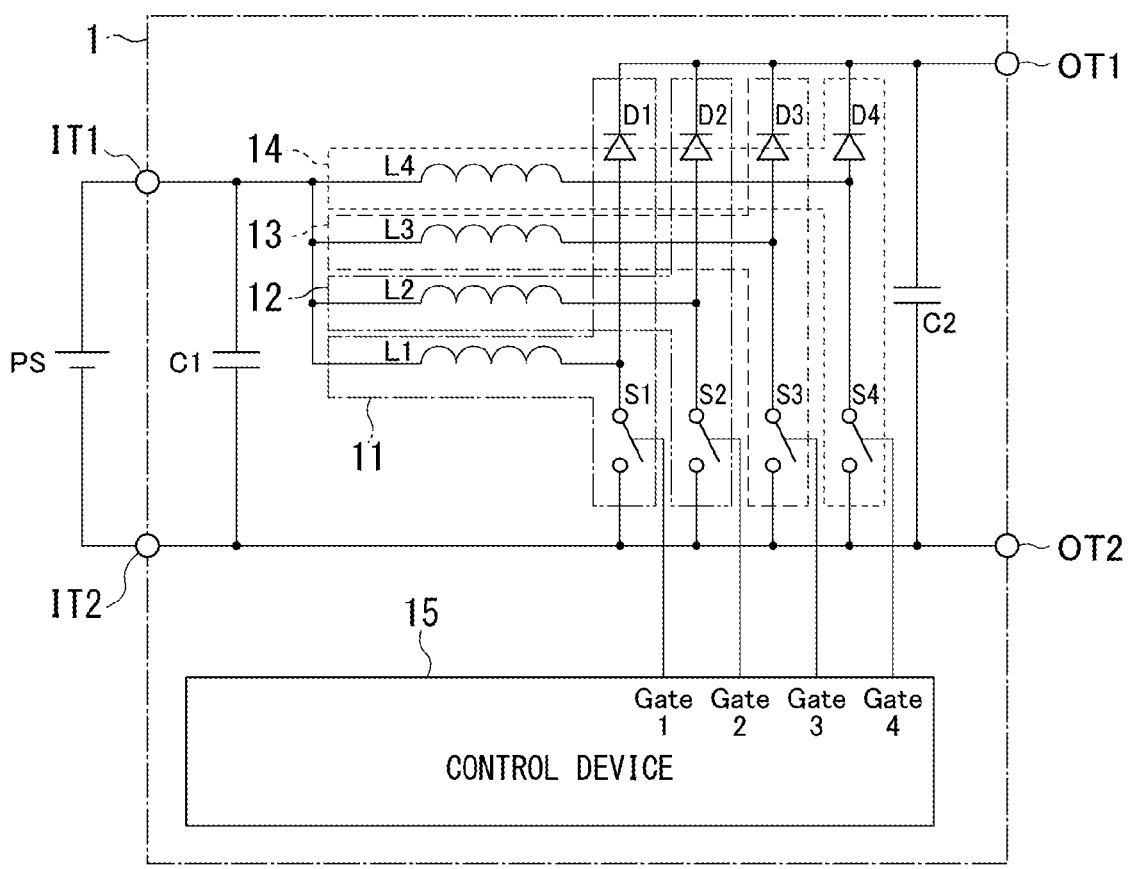
FIG. 6 is a diagram showing an example of a schematic configuration of the power conversion device of the second embodiment.

FIG. 6 is a diagram showing an example of a schematic configuration of the power conversion device 1 of the second embodiment.

Although the power conversion device 1 includes two conversion units 11 and 12 in the example shown in FIG. 1, the power conversion device 1 includes four conversion units 11 to 14 in the example shown in FIG. 6. In another example, the power conversion device 1 may include a number of conversion units other than four conversion units (here, the number of conversion units is a natural number greater than or equal to 3).

In the example shown in FIG. 6, the power conversion device 1 includes conversion units 11 to 14, capacitors C1 and C2, and a control device 15. In detail, the power conversion device 1 includes the conversion unit 11 that continues to operate before and after the number of operating conversion units is increased and the conversion units 12 to 14 that have started to operate from the non-operating state as a plurality of conversion units.

The conversion units 11 to 14 perform voltage conversion of electric power supplied from the power supply PS. The conversion unit 11, the conversion unit 12, the conversion unit 13, and the conversion unit 14 are electrically connected to each other in parallel. The conversion unit 11 includes a reactor L1, a diode D1, and a switch S1. The conversion unit 12 includes a reactor L2, a diode D2, and a switch S2. The conversion unit 13 includes a reactor L3, a diode D3, and a switch S3. The conversion unit 14 includes a reactor L4, a diode D4, and a switch S4.

The control device 15 sets a conversion unit that operates within the conversion units 11 to 14. In detail, the control device 15 executes control of the switch S1 of the conversion unit 11, control of the switch S2 of the conversion unit 12, control of the switch S3 of the conversion unit 13, and control of the switch S4 of the conversion unit 14.

In the example shown in FIG. 6, an input terminal IT1 is connected to one end of the capacitor C1, one end of the reactor L1, one end of the reactor L2, one end of the reactor L3, and one end of the reactor L4.

An input terminal IT2 is connected to the other end of the capacitor C1, one end of the switch S1, one end of the switch S2, one end of the switch S3, one end of the switch S4, one end of the capacitor C2, and an output terminal OT2.

The other end of the reactor L1 is connected to the other end of the switch S1 and one end of the diode D1. The switch S1 is connected to the control device 15. The other end of the reactor L2 is connected to the other end of the switch S2 and one end of the diode D2. The switch S2 is connected to the control device 15. The other end of the reactor L3 is connected to the other end of the switch S3 and one end of the diode D3. The switch S3 is connected to the control device 15. The other end of the reactor L4 is connected to the other end of the switch S4 and one end of the diode D4. The switch S4 is connected to the control device 15.

The output terminal OT1 is connected to the other end of the diode D1, the other end of the diode D2, the other end of the diode D3, the other end of the diode D4, and the other end of the capacitor C2.

Figure 7:
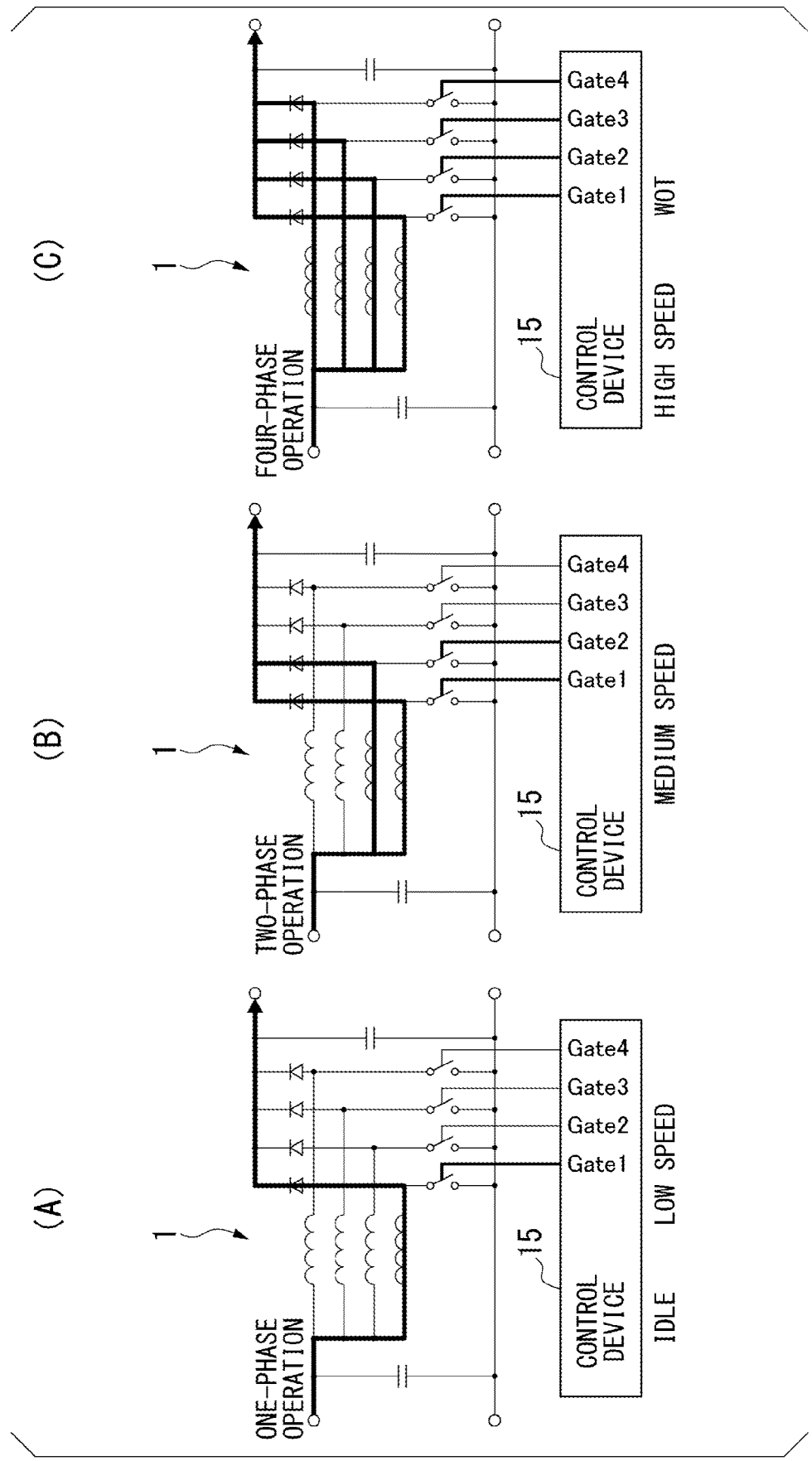
FIG. 7 is a diagram for describing an example of a first state, a second state, and a third state in the power conversion device of the second embodiment.

FIG. 7 is a diagram for describing an example of a first state, a second state, and a third state in the power conversion device 1 of the second embodiment. In detail, FIG. 7(A) shows the first state (a one-phase operation state) of the power conversion device 1 in which the conversion unit 11 is operating and the conversion units 12 to 14 are not operating, FIG. 7(B) shows the second state (a two-phase operation state) of the power conversion device 1 in which the conversion units 11 and 12 are operating and the conversion units 13 and 14 are not operating, and FIG. 7(C) shows the third state (a four-phase operation state) of the power conversion device 1 in which the conversion units 11 to 14 are operating.

In the examples shown in FIGS. 6 and 7, when the total electric current flowing through the power conversion device 1 is increased from, for example, zero, the power conversion device 1 is in the first state (the one-phase operation state) shown in FIG. 7(A). When the total electric current flowing through the power conversion device 1 is further increased to reach a first state-second state switching threshold value (corresponding to the phase switching threshold value Ith in the example shown in FIG. 2), the power conversion device 1 is in the second state (the two-phase operation state) shown in FIG. 7(B). When the total electric current flowing through the power conversion device 1 is further increased to reach a second state-third state switching threshold value, the power conversion device 1 is in the third state (the four-phase operation state) shown in FIG. 7(C).

In the examples shown in FIGS. 6 and 7, when the power conversion device 1 changes from the first state to the third state, the control device 15 makes the electric current I2 flowing through the conversion unit 12 having a lower temperature than the conversion unit 11 larger than the electric current I1 flowing through the conversion unit 11 after the power conversion device 1 is switched from the first state to the second state. Thus, in the examples shown in FIGS. 6 and 7, the temperature T2 of the conversion unit 12 and the temperature T1 of the conversion unit 11 can also be made uniform early as in the example shown in FIG. 2.

Next, after the power conversion device 1 is switched from the second state to the third state, the control device 15 makes the electric current I3 flowing through the conversion unit 13 having a lower temperature than the conversion unit 11 and the electric current I4 flowing through the conversion unit 14 having a lower temperature than the conversion unit 11 larger than the electric current I1 flowing through the conversion unit 11. Thus, in the examples shown in FIGS. 6 and 7, the temperature T3 of the conversion unit 13, the temperature T4 of the conversion unit 14, and the temperature T1 of the conversion unit 11 can be made uniform early.

In the examples shown in FIGS. 6 and 7, after the power conversion device 1 is switched from the second state to the third state, the control device 15 makes the electric current I3 flowing through the conversion unit 13 and the electric current I4 flowing through the conversion unit 14 larger than the electric current I3 flowing through the conversion unit 13 and the electric current I4 flowing through the conversion unit 14 after the temperature T3 of the conversion unit 13, the temperature T4 of the conversion unit 14, and the temperature T1 of the conversion unit 11 are made uniform. That is, the control device 15 causes the electric current I3 flowing through the conversion unit 13 and the electric current I4 flowing through the conversion unit 14 to overshoot after the power conversion device 1 switches from the second state to the third state.

Thus, in the examples shown in FIGS. 6 and 7, the temperature T3 of the conversion unit 13 and the temperature T4 of the conversion unit 14 can be raised more quickly than when the electric current I3 flowing through the conversion unit 13 and the electric current I4 flowing through the conversion unit 14 are not overshot. As a result, the temperature T3 of the conversion unit 13, the temperature T4 of the conversion unit 14, and the temperature T1 of the conversion unit 11 are made uniform earlier than when the electric current I3 flowing through the conversion unit 13 and the electric current I4 flowing through the conversion unit 14 are not overshot.

Incidentally, in the examples shown in FIGS. 6 and 7 (the power conversion device 1 of the second embodiment), after the power conversion device 1 is switched from the second state to the third state, there may be a first case in which the temperature T2 of the conversion unit 12 is already uniform with the temperature T1 of the conversion unit 11 (i.e., when the temperature difference |T1−T2| between the conversion unit 11 and the conversion unit 12 is already less than the threshold value) and a second case in which the temperature T2 of the conversion unit 12 are not uniform with the temperature T1 of the conversion unit 11 (i.e., when the temperature difference |T1−T2| between the conversion unit 11 and the conversion unit 12 is already greater than or equal to the threshold value).

Accordingly, in the example shown in FIGS. 6 and 7 (the power conversion device 1 of the second embodiment), after the power conversion device 1 is switched from the second state to the third state, the control device 15 executes different types of control in the first case and the second case.

In the example shown in FIGS. 6 and 7 (the power conversion device 1 of the second embodiment), in the first case in which the temperature T2 of the conversion unit 12 is already made uniform with the temperature T1 of the conversion unit 11 (i.e., when the temperature difference |T1−T2| between the conversion unit 11 and the conversion unit 12 is already less than the threshold value) after the power conversion device 1 is switched from the second state to the third state, the control device 15 makes the electric current I2 flowing through the conversion unit 12 equal to the electric current I1 flowing through the conversion unit 11 and makes the electric current I3 flowing through the conversion unit 13 and the electric current I4 flowing through the conversion unit 14 larger than the electric current I1 flowing through the conversion unit 11. On the other hand, in the second case in which the temperature T2 of the conversion unit 12 is not made uniform with the temperature T1 of the conversion unit 11 (i.e., when the temperature difference |T1−T2| between the conversion unit 11 and the conversion unit 12 is greater than or equal to the threshold value) after the power conversion device 1 is switched from the second state to the third state, the control device 15 makes the electric current I2 flowing through the conversion unit 12, the electric current I3 flowing through the conversion unit 13, and the electric current I4 flowing through the conversion unit 14 larger than the electric current I1 flowing through the conversion unit 11. Further, the control device 15 makes the increase speed of the electric current I3 flowing through the conversion unit 13 and the increase speed of the electric current I4 flowing through the conversion unit 14 greater than the increase speed of the electric current I2 flowing through the conversion unit 12 (corresponding to a slope of the electric current I2 in FIG. 2(A)).

Thus, in the examples shown in FIGS. 6 and 7, it is possible to cause the temperature T3 of the conversion unit 13 and the temperature T4 of the conversion unit 14 to be raised more quickly than when the increase speed of the electric current I3 flowing through the conversion unit 13 and the increase speed of the electric current I4 flowing through the conversion unit 14 are not made greater than the increase speed of the electric current I2 flowing through the conversion unit 12 and it is possible to make the temperature T1 of the conversion unit 11, the temperature T2 of the conversion unit 12, the temperature T3 of the conversion unit 13, and the temperature T4 of the conversion unit 14 uniform early.

Figure 8:
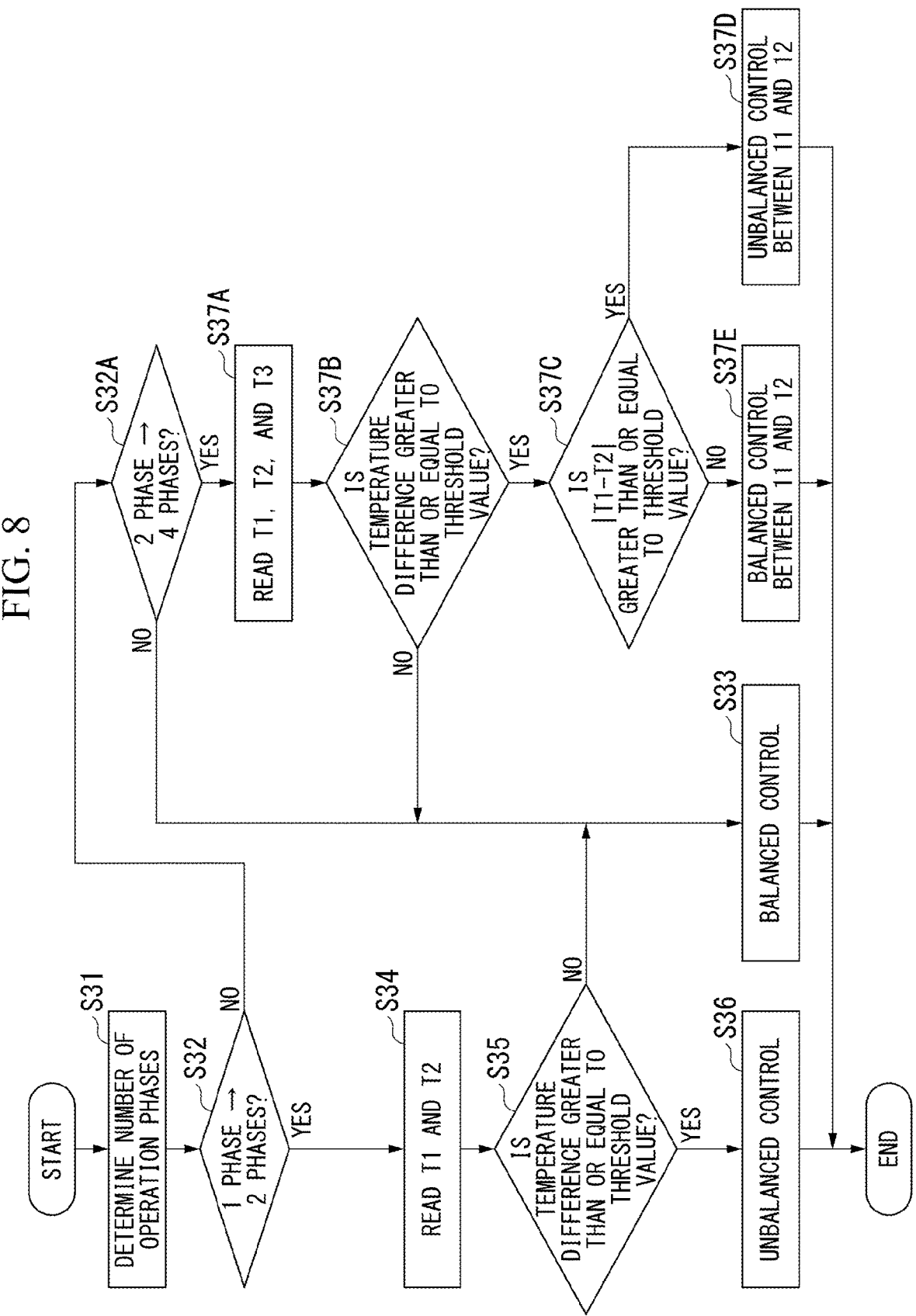
FIG. 8 is a flowchart for describing an example of a process executed in the power conversion device of the second embodiment.

FIG. 8 is a flowchart for describing an example of a process executed in the power conversion device 1 of the second embodiment.

In the example shown in FIG. 8, in step S31, the control device 15 executes a number-of-operation-phases determination (a determination of the number of conversion units that are operating within the conversion units 11 to 14).

In detail, in step S31, the control device 15 determines whether or not the total electric current IT flowing through the conversion units 11 to 14 is less than the first state-second state switching threshold value, whether or not the total electric current IT flowing through the conversion units 11 to 14 is greater than or equal to the first state-second state switching threshold value, whether or not the total electric current IT flowing through the conversion units 11 to 14 is less than the second state-third state switching threshold value, whether or not the total electric current IT flowing through the conversion units 11 to 14 is greater than or equal to the second state-third state switching threshold value, or the like. When the total electric current IT flowing through the conversion units 11 to 14 is less than the first state-second state switching threshold value, the control device 15 determines that the number of operation phases is 1 (i.e., the number of conversion units that are operating within the conversion units 11 to 14 is "1"). When the total electric current IT flowing through the conversion units 11 to 14 is greater than or equal to the first state-second state switching threshold value and less than the second state-third state switching threshold value, the control device 15 determines that the number of operation phases is 2 (i.e., the number of conversion units that are operating within the conversion units 11 to 14 is "2"). When the total electric current IT flowing through the conversion units 11 to 14 is greater than or equal to the second state-third state switching threshold value, the control device 15 determines that the number of operation phases is 4 (i.e., the number of conversion units that are operating within the conversion units 11 to 14 is "4").

When the total electric current IT flowing through the conversion units 11 to 14 changes from an electric current less than the first state-second state switching threshold value to an electric current greater than or equal to the first state-second state switching threshold value and less than the second state-third state switching threshold value, the control device 15 determines that the number of operation phases is to be switched from 1 to 2 (i.e., that the number of conversion units that are operating within the conversion units 11 to 14 is to be increased from "1" to "2"). When the total electric current IT flowing through the conversion units 11 to 14 changes from an electric current greater than or equal to the first state-second state switching threshold value and less than the second state-third state switching threshold value to an electric current greater than or equal to the second state-third state switching threshold value, the control device 15 determines that the number of operation phases is to be switched from 2 to 4 (i.e., the number of conversion units that are operating within the conversion units 11 to 14 is to be increased from "2" to "4").

Next, in step S32, the control device 15 determines whether or not the number of operation phases is to be switched from 1 to 2 (i.e., whether or not the number of conversion units that are operating within the conversion units 11 to 14 is to be increased from "1" to "2") on the basis of the determination result of step S31. When the number of operation phases is not to be switched from 1 to 2 (i.e., when the number of conversion units that are operating within the conversion units 11 to 14 is not to be increased from "1" to "2"), the process proceeds to step S32A. On the other hand, when the number of operation phases is to be switched from 1 to 2 (i.e., when the number of conversion units that are operating within the conversion units 11 to 14 is to be increased from "1" to "2"), the process proceeds to step S34.

In step S32A, the control device 15 determines whether or not the number of operation phases is to be switched from 2 to 4 (i.e., whether or not the number of conversion units that are operating within the conversion units 11 to 14 is to be increased from "2" to "4") on the basis of the determination result of step S31. When the number of operation phases is not to be switched from 2 to 4 (i.e., when the number of conversion units that are operating within the conversion units 11 to 14 is not to be increased from "2" to "4"), the process proceeds to step S33. On the other hand, when the number of operation phases is to be switched from 2 to 4 (i.e., when the number of conversion units that are operating within the conversion units 11 to 14 is to be increased from "2" to "4"), the process proceeds to step S37A.

In step S33, the control device 15 executes balanced control.

In detail, when the total electric current IT flowing through the conversion units 11 to 14 is less than the first state-second state switching threshold value, the control device 15 makes the electric current I1 flowing through the conversion unit 11 equal to the total electric current IT flowing through the conversion units 11 to 14 and sets the electric currents I2 to I4 flowing through the conversion units 12 to 14 to zero.

When the total electric current IT flowing through the conversion units 11 to 14 is greater than or equal to the first state-second state switching threshold value and less than the second state-third state switching threshold value, the control device 15 sets the electric current I1 flowing through the conversion unit 11 to 50% of the total electric current IT flowing through the conversion units 11 to 14 and sets the electric current I2 flowing through the conversion unit 12 to 50% of the total electric current IT flowing through the conversion units 11 to 14 (i.e., the electric current I1 flowing through the conversion unit 11 and the electric current I2 flowing through the conversion unit 12 are made uniform) or attempts to set the electric current I1 flowing through the conversion unit 11 to 50% of the total electric current IT flowing through the conversion units 11 to 14 and set the electric current I2 flowing through the conversion unit 12 to 50% of the total electric current IT flowing through the conversion units 11 to 14 (i.e., the electric current I1 flowing through the conversion unit 11 and the electric current I2 flowing through the conversion unit 12 are attempted to be made uniform).

When the total electric current IT flowing through the conversion units 11 to 14 is greater than or equal to the second state-third state switching threshold value, the control device 15 sets each of the electric current I1 flowing through the conversion unit 11, the electric current I2 flowing through the conversion unit 12, the electric current I3 flowing through the conversion unit 13, and the electric current I4 flowing through the conversion unit 14 to 25% of the total electric current IT flowing through the conversion units 11 to 14 (i.e., the electric current I1 flowing through the conversion unit 11, the electric current I2 flowing through the conversion unit 12, the electric current I3 flowing through the conversion unit 13, and the electric current I4 flowing through the conversion unit 14 are made uniform) or attempts to set each of the electric current I1 flowing through the conversion unit 11, the electric current I2 flowing through the conversion unit 12, the electric current I3 flowing through the conversion unit 13, and the electric current I4 flowing through the conversion unit 14 to 25% of the total electric current IT flowing through the conversion units 11 to 14 (i.e., the electric current I1 flowing through the conversion unit 11, the electric current I2 flowing through the conversion unit 12, the electric current I3 flowing through the conversion unit 13, and the electric current I4 flowing through the conversion unit 14 are attempted to be made uniform).

In step S34, the control device 15 reads the temperature T1 of the conversion unit 11 detected by the temperature sensor of the conversion unit 11 and reads the temperature T2 of the conversion unit 12 detected by the temperature sensor of the conversion unit 12.

Next, in step S35, the control device 15 determines whether or not the temperature difference |T1−T2| between the conversion units 11 and 12 is greater than or equal to the threshold value on the basis of the temperature T1 of the conversion unit 11 and the temperature T2 of the conversion unit 12 read in step S34. When the temperature difference |T1−T2| between the conversion units 11 and 12 is not greater than or equal to the threshold value (substantially, when there is no temperature difference between the conversion unit 11 and the conversion unit 12 (T1−T2≈0)), the process proceeds to step S33. In step S33, the control device 15 attempts to set the electric current I1 flowing through the conversion unit 11 to 50% of the total electric current IT flowing through the conversion units 11 to 14 and set the electric current I2 flowing through the conversion unit 12 to 50% of the total electric current IT flowing through the conversion units 11 to 14 (i.e., the electric current I1 flowing through the conversion unit 11 and the electric current I2 flowing through the conversion unit 12 are attempted to be made uniform). On the other hand, when the temperature difference |T1−T2| of the conversion units 11 and 12 is greater than or equal to the threshold value (substantially, there is a temperature difference between the conversion unit 11 and the conversion unit 12 (|T1−T2|>0)), the process proceeds to step S36.

In step S36, the control device 15 executes unbalanced control as in step S16 of FIG. 4.

In step S37A, the control device 15 reads the temperature T1 of the conversion unit 11 detected by the temperature sensor of the conversion unit 11, reads the temperature T2 of the conversion unit 12 detected by the temperature sensor of the conversion unit 12, and reads the temperature T3 of the conversion unit 13 detected by the temperature sensor of the conversion unit 13.

In the example shown in FIG. 8, the control device 15 estimates that the temperature T3 of the conversion unit 13 and the temperature T4 of the conversion unit 14 are equal. In another example, the control device 15 may read the temperature T4 of the conversion unit 14 detected by the temperature sensor of the conversion unit 14.

Next, in step S37B, the control device 15 determines whether or not the temperature difference |T1−T2| between the conversion units 11 and 12 is greater than or equal to the threshold value and whether or not the temperature difference |T1−T3| between the conversion units 11 and 13 is greater than or equal to the threshold value on the basis of the temperature T1 of the conversion unit 11, the temperature T2 of the conversion unit 12, and the temperature T3 of the conversion unit 13 read in step S37A. When the temperature difference |T1−T2| between the conversion units 11 and 12 is not greater than or equal to the threshold value (substantially, when there is no temperature difference between the conversion unit 11 and the conversion unit 12 (T1−T2≈0)) and when the temperature difference |T1−T3| between the conversion units 11 and 13 is not greater than or equal to the threshold value (substantially, when there is no temperature difference between the conversion unit 11 and the conversion unit 13 (T1−T3≈0)), the process proceeds to step S33. In step S33, the control device 15 attempts to set each of the electric current I1 flowing through the conversion unit 11, the electric current I2 flowing through the conversion unit 12, the electric current I3 flowing through the conversion unit 13, and the electric current I4 flowing through the conversion unit 14 to 25% of the total electric current IT flowing through the conversion units 11 to 14 (i.e., the electric current I1 flowing through the conversion unit 11, the electric current I2 flowing through the conversion unit 12, the electric current I3 flowing through the conversion unit 13, and the electric current I4 flowing through the conversion unit 14 are attempted to be made uniform). On the other hand, when the temperature difference |T1−T3| of the conversion units 11 and 13 is greater than or equal to the threshold value (substantially, there is a temperature difference between the conversion unit 11 and the conversion unit 13 (|T1−T3|>0)), the process proceeds to step S37C.

In step S37C, the control device 15 determines whether or not the temperature difference |T1−T2| between the conversion units 11 and 12 is greater than or equal to the threshold value and the temperature difference |T1−T3| between the conversion units 11 and 13 is greater than or equal to the threshold value on the basis of the temperature T1 of the conversion unit 11, the temperature T2 of the conversion unit 12, and the temperature T3 of the conversion unit 13 read in step S37A. When the temperature difference |T1−T2| between the conversion units 11 and 12 is greater than or equal to the threshold value and the temperature difference |T1−T3| between the conversion units 11 and 13 is greater than or equal to the threshold value (substantially, there is a temperature difference between the conversion unit 11 and the conversion unit 12 (|T1−T2|>0) and there is a temperature difference between the conversion unit 11 and the conversion unit 13 (|T1−T3|>0)), the process proceeds to step S37D. On the other hand, when the temperature difference |T1−T2| of the conversion units 11 and 12 is not greater than or equal to the threshold value (substantially, there is no temperature difference between the conversion unit 11 and the conversion unit 12 (T1−T2≈0)), the process proceeds to step S37E.

In step S37D, the control device 15 makes the electric current I2 flowing through the conversion unit 12, the electric current I3 flowing through the conversion unit 13, and the electric current I4 flowing through the conversion unit 14 larger than the electric current I1 flowing through the conversion unit 11. That is, the control device 15 executes unbalanced control between the conversion unit 11 and the conversion unit 12, and executes unbalanced control between the conversion unit 11, the conversion unit 13, and the conversion unit 14.

Further, the control device 15 makes the increase speed of the electric current I3 flowing through the conversion unit 13 and the increase speed of the electric current I4 flowing through the conversion unit 14 greater than the increase speed of the electric current I2 flowing through the conversion unit 12 (corresponding to a slope of the electric current I2 in FIG. 2(A)).

In step S37E, the control device 15 makes the electric current I2 flowing through the conversion unit 12 equal to the electric current I1 flowing through the conversion unit 11 and makes the electric current I3 flowing through the conversion unit 13 and the electric current I4 flowing through the conversion unit 14 larger than the electric current I1 flowing through the conversion unit 11. That is, the control device 15 executes the balanced control between the conversion unit 11 and the conversion unit 12 and executes the unbalanced control between the conversion unit 11, the conversion unit 13, and the conversion unit 14.

The start of failure detection after shifting to the two-phase operation may be delayed and an increase in the temperature of the conversion unit may be caused in the power conversion device of the comparative example, whereas the above problems can be reduced in the power conversion device 1 of the first or second embodiment.

In the power conversion device 1 of the first or second embodiment, the failure can be detected early, the risk of an abnormal operation due to the sensor failure can be reduced, and the commercial value can be improved.

<Application Example>

Figure 9:
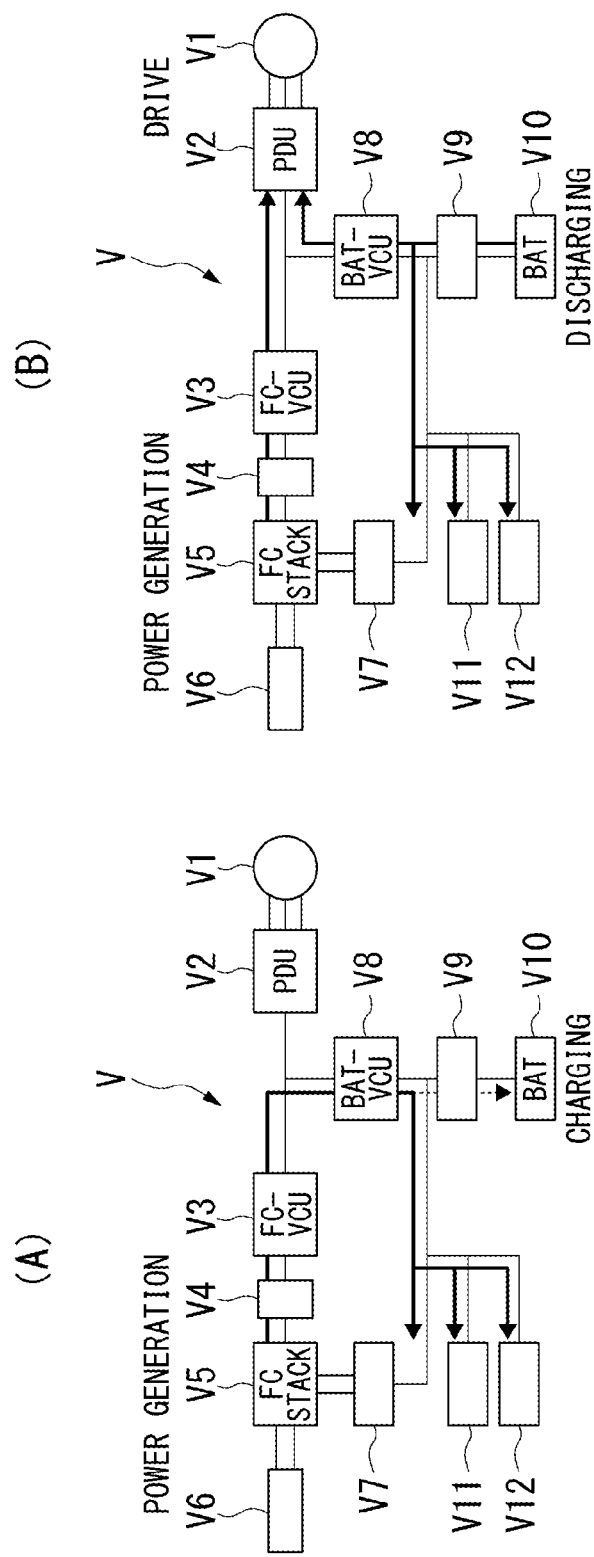
FIG. 9 is a diagram showing an example of a vehicle to which the power conversion device of the second embodiment is applied.

FIG. 9 is a diagram showing an example of a vehicle V to which the power conversion device 1 of the second embodiment is applied. In detail, FIG. 9(A) shows the vehicle V in a state in which the number of operation phases of the power conversion device 1 is 1 (the state shown in FIG. 7(A)) and FIG. 9(B) shows the vehicle V in a state in which the number of operation phases of the power conversion device 1 is 2 or 4 (the state shown in FIG. 7(B) or FIG. 7(C)).

In the example shown in FIG. 9, the vehicle V is a traveling motor V1, a power drive unit (PDU) V2, a fuel cell voltage control unit (FC-VCU) V3, an FC control unit V4, an FC stack V5, a hydrogen injector V6, an air pump V7, a battery VCU V8, a battery control unit V9, a battery V10, an electric air conditioner V11, and a DC/DC converter V12.

The traveling motor V1 has a function similar to that of the traveling motor described in, for example, Japanese Unexamined Patent Application, First Publication No. 2018-207620. For example, the PDU V2 has a function similar to the PDU described in Patent Document 1. For example, the FC-VCU V3 has a function similar to that of the FC-VCU described in Patent Document 1. For example, the FC control unit V4 has a function similar to that of the fuel cell control unit (FC control unit) described in Japanese Unexamined Patent Application, First Publication No. 2010-124588. For example, the FC stack V5 has a function similar to that of the FC stack described in Patent Document 1. The hydrogen injector V6 supplies hydrogen to the FC stack V5. The air pump V7 supplies air (oxygen) to the FC stack V5. For example, the battery VCU V8 has a function similar to that of the VCU described in Patent Document 1. For example, the battery control unit V9 has a function similar to that of a battery control unit described in Japanese Unexamined Patent Application, First Publication No. 2010-124588. For example, the battery V10 has a function similar to that of the battery described in Patent Document 1. The electric air conditioner V11 and the DC/DC converter V12 constitutes a part of auxiliary equipment of the vehicle V.

In the example shown in FIG. 9, the power conversion device 1 of the second embodiment is used as the fuel cell voltage control unit (FC-VCU) V3.

During an idle operation or a low-speed operation of the vehicle V, the power conversion device 1 (the FC-VCU V3) is in the first state (the one-phase operation state) described above. As shown in FIG. 9(A), electric power is generated by the FC stack V5, and the generated electric power of the FC stack V5 is supplied to the traveling motor V1, the air pump V7 serving as auxiliary equipment, the electric air conditioner V11, and the DC/DC converter V12, and the battery V10 is charged as needed.

For the time of a medium- or high-speed operation of the vehicle V (including the time of a wide open throttle (WOT) operation), the power conversion device 1 (the FC-VCU V3) is in the second state (the two-phase operation state) or the third state (the four-phase operation state) described above. As shown in FIG. 9B, electric power is generated by the FC stack V5 and the generated electric power of the FC stack V5 and the electric power from the battery V10 are supplied to the traveling motor V1. Further, the electric power from the battery V10 is also supplied to the air pump V7 serving as the auxiliary equipment, the electric air conditioner V11, and the DC/DC converter V12. In the active research of the present inventor, in the application example shown in FIG. 9, the loss during an operation of the vehicle V could be reduced by 30% as compared with the vehicle to which the power conversion device of the comparative example was applied.

Although the power conversion device 1 of the second embodiment is used as the FC-VCU V3 in the example shown in FIG. 9, the power conversion device 1 of the first embodiment is used as the FC-VCU V3 in another example. In still another example, the power conversion device 1 of the first or second embodiment may perform voltage conversion of the electric power supplied from the battery V10 to the traveling motor V1.

While embodiments of the present invention have been presented by way of example only and are not intended to limit the scope of the inventions. These embodiments may be embodied in a variety of other forms. Various omissions, substitutions, and changes may be made without departing from the spirit of the inventions. The inventions described in the accompanying claims and their equivalents are intended to cover such embodiments or modifications as would fall within the scope and spirit of the inventions.

What is claimed is:

1. A power conversion device comprising:
    a plurality of conversion units electrically connected in parallel to each other and configured to perform voltage conversion of electric power supplied from a power supply; and
    a control device configured to set a conversion unit that will operate within the plurality of conversion units,
    wherein, after the number of conversion units that are operating within the plurality of conversion units is increased, the control device makes an electric current flowing through a conversion unit that has started to operate from a non-operating state larger than an electric current flowing through a conversion unit that continues to operate before and after the number of operating conversion units is increased, when a temperature of the conversion unit that has started to operate from the non-operating state is lower than a temperature of the conversion unit that continues to operate before and after the number of operating conversion units is increased.

2. The power conversion device according to claim 1, wherein the control device makes an electric current flowing through an operation start conversion unit which is the conversion unit that has started to operate from the non-operating state during a period in which the number of conversion units that are operating within the plurality of conversion units is increased larger than an electric current flowing through the operation start conversion unit after the period.

3. The power conversion device according to claim 2, wherein the control device makes the electric current flowing through the operation start conversion unit smaller than an electric current flowing through an operation maintenance conversion unit, which is a conversion unit that continues to operate before and after the number of operating conversion units is increased, from a starting time of the period to a predetermined time after the starting time, and wherein the control device makes the electric current flowing through the operation start conversion unit larger than the electric current flowing through the operation maintenance conversion unit, from the predetermined time to an ending time of the period.

4. The power conversion device according to claim 1, wherein the control device makes an electric current flowing through a conversion unit having a low temperature larger than an electric current flowing through a conversion unit having a high temperature when a temperature difference in the plurality of conversion units is greater than or equal to a threshold value.

5. The power conversion device according to claim 1, wherein the plurality of conversion units include at least a first conversion unit and a second conversion unit serving as an operation maintenance conversion unit, which is a conversion unit that continues to operate before and after the number of operating conversion units is increased and a third conversion unit serving as an operation start conversion unit which is a conversion unit that has started to operate from the non-operating state and wherein, when there is a change from a second state in which the first conversion unit and the second conversion unit are operating and the third conversion unit is not operating to a third state in which the first conversion unit, the second conversion unit, and the third conversion unit are operating, the control device makes an electric current flowing through the third conversion unit larger than electric currents flowing through the first conversion unit and the second conversion unit.

6. The power conversion device according to claim 5, wherein, when a temperature difference between the first conversion unit and the second conversion unit is less than a threshold value after switching from the second state to the third state, the control device makes the electric current flowing through the second conversion unit equal to the electric current flowing through the first conversion unit and makes the electric current flowing through the third conversion unit larger than the electric current flowing through the first conversion unit.

7. The power conversion device according to claim 6, wherein, when the temperature difference between the first conversion unit and the second conversion unit is greater than or equal to the threshold value after there is a change from a first state in which the first conversion unit is operating and the second conversion unit and the third conversion unit are not operating to the second state in which the first conversion unit and the second conversion unit are operating and the third conversion unit is not operating and subsequently switching from the second state to the third state in which the first conversion unit, the second conversion unit, and the third conversion unit are operating is performed, the control device makes the electric current flowing through the second conversion unit and the electric current flowing through the third conversion unit larger than the electric current flowing through the first conversion unit and makes an increase speed of the electric current flowing through the third conversion unit greater than an increase speed of the electric current flowing through the second conversion unit.

8. The power conversion device according to claim 1, wherein the plurality of conversion units include at least a first conversion unit, a second conversion unit, and a third conversion unit serving as an operation maintenance conversion unit, which is the conversion unit that continues to operate before and after the number of operating conversion units is increased, and a fourth conversion unit serving as an operation start conversion unit which is the conversion unit that has started to operate from the non-operating state and wherein, when there is a change from a third state in which the first conversion unit, the second conversion unit, and the third conversion unit are operating and the fourth conversion unit is not operating to a fourth state in which the first conversion unit, the second conversion unit, the third conversion unit, and the fourth conversion unit are operating, the control device makes an electric current flowing through the fourth conversion unit larger than electric currents flowing through the first conversion unit, the second conversion unit, and the third conversion unit.

* * * * *